No. 665,906. Patented Jan. 15, 1901.
W. C. HOOKER.
ANIMAL TRAP.
(Application filed Nov. 5, 1900.)
(No Model.)

Witnesses
Fred E. Maynard
H. H. Riley

W. C. Hooker, Inventor.
By C. A. Snow & Co.
Attorneys

THE NORRIS PETERS CO., PHOTO-LITHO., WASHINGTON, D. C.

UNITED STATES PATENT OFFICE.

WILLIAM C. HOOKER, OF ABINGDON, ILLINOIS.

ANIMAL-TRAP.

SPECIFICATION forming part of Letters Patent No. 665,906, dated January 15, 1901.

Application filed November 5, 1900. Serial No. 35,557. (No model.)

*To all whom it may concern:*

Be it known that I, WILLIAM C. HOOKER, a citizen of the United States, residing at Abingdon, in the county of Knox and State of Illinois, have invented a new and useful Animal-Trap, of which the following is a specification.

The invention relates to improvements in animal-traps.

The object of the present invention is to improve the construction of animal-traps and to provide a simple, inexpensive, and efficient one, which will be exceedingly sensitive and which will be adapted to be either baited or to be placed in a runway or adjacent to a hole, without a bait, so that it will be operated by an animal passing over it.

The invention consists in the construction and novel combination and arrangement of parts hereinafter fully described, illustrated in the accompanying drawings, and pointed out in the claims hereto appended.

Figure 1:
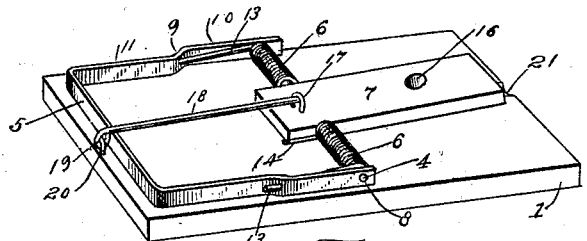
Figure 2:
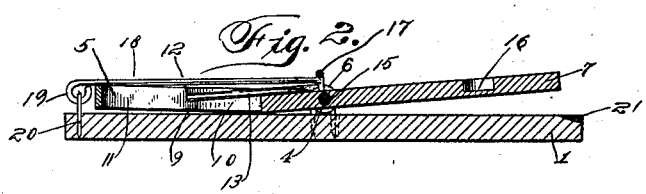
Figure 3:
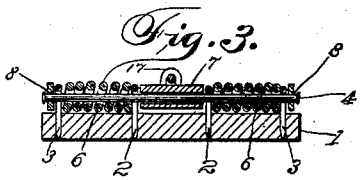
Figure 4:
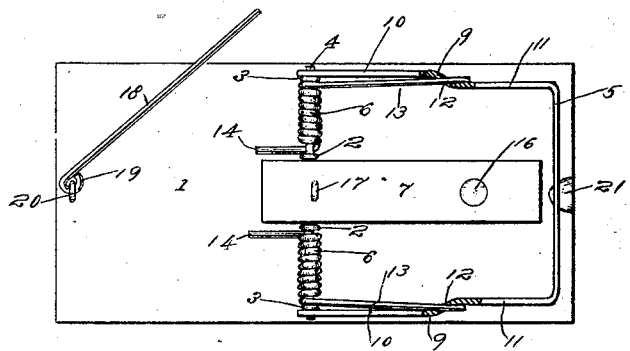

In the drawings, Figure 1 is a perspective view of an animal-trap constructed in accordance with this invention and shown set. Fig. 2 is a longitudinal sectional view of the same. Fig. 3 is a transverse sectional view. Fig. 4 is a plan view, the trap being sprung.

Like numerals of reference designate corresponding parts in all the figures of the drawings.

1 designates a flat base, preferably consisting of a rectangular piece of thin wood or other suitable material, and provided with inner and outer eyes 2 and 3, forming bearings for a transverse pintle 4, and consisting, preferably, of staples, which have their sides or legs passed through the base and clenched or upset against the lower face thereof. The pintle 4, which hinges a movable jaw 5 to the base, forms a pintle or pivot for a bait-treadle and supports a pair of coiled springs 6, which are located at opposite sides of the bait-treadle 7. The movable jaw, which is approximately U-shaped, is provided at the terminals of its sides with perforations 8 for the reception of the ends of the transverse pintle, which is preferably headed to retain the sides on it. The sides of the movable jaw are provided between their ends with angular bends 9, which offset the portions 10 of the sides from the portions 11, and the said bends 9 are provided with perforations 12 for the reception of arms 13, which extend forward from the outer ends of the coiled springs when the trap is sprung, as illustrated in Fig. 4 of the accompanying drawings. The coiled springs 6 are provided at their inner ends with rearwardly-extending arms 14 and they are disposed on the transverse pintle between the bait-treadle and the sides of the movable jaw, and the said arms 14 bear against the upper face of the base, and when the movable jaw is swung backward from the position illustrated in Fig. 4 to that shown in Fig. 1 to set the trap the springs are placed under tension and are adapted to throw the movable jaw forwardly with great force when the trap is sprung.

The bait-treadle is provided, near its rear end, with a transverse perforation 15 for the reception of the transverse pintle, and the inner eyes 2 are located at opposite sides of the bait-treadle and prevent the latter from moving laterally in either direction. The front portion of the bait-treadle is provided with a cavity or recess 16, adapted to form a receptacle for a suitable bait for attracting the animals to be captured, and when the trap is set the front portion of the treadle is arranged in an elevated position, as clearly shown in Fig. 2, and is adapted to be depressed to carry an eye 17 out of engagement with a hinged rod or lever 18. The eye 17, which preferably consists of a staple, is located slightly in advance of the rear face of the transverse pivot, whereby when the trap is set the treadle will be maintained in the said elevated position. The rod 18 is hinged to the rear end of the base and is preferably provided with an eye 19, which is linked into a staple 20, which forms an eye at the rear end of the base. The outer eyes 3 are located at the inner faces of the sides of the movable jaw, and the outer forwardly-extending arms of the coiled springs project through the perforations of the movable jaw sufficiently to securely connect the latter with the springs. The front end of the base is provided with a depression or recess 21 to enable the finger to be readily introduced beneath the movable jaw, so that the latter may be readily grasped in setting the trap.

It will be seen that the trap is exceedingly simple and inexpensive in construction, that the transverse pintle supports the bait treadle or lever, the springs, and the movable jaw, and that the latter is securely connected to the springs by means of the angular bends with their perforations for the reception of the outer arms of the springs. It will also be apparent that the trap may be either baited or placed unbaited near a hole or in a runway, so that it will be operated by contact with an animal passing over it.

What I claim is—

1. A trap comprising a base, a movable jaw hinged to the base and provided at its sides with angular bends having perforations, springs mounted on the base and provided with arms extending through the perforations of the said bends, and means for setting and tripping the movable jaw, substantially as described.

2. A trap comprising a base, an approximately U-shaped movable jaw provided at its sides with intermediate bends offsetting the inner portions of the sides from the outer portions thereof, the spring-coils provided with longitudinal arms extending through the perforations of the bends of the sides of the jaw, a bait treadle or lever, and a rod connected with the base and adapted to engage the jaw and the treadle or lever, substantially as described.

3. A trap comprising a base, a transverse pintle, a jaw hinged to the base by the transverse pintle and provided at opposite sides with bends having perforations, a centrally-arranged bait-treadle mounted on the transverse pintle, the springs arranged at opposite sides of the bait-treadle and supported by the pintle, and provided with arms extending through the perforations of the said bends of the movable jaw, and a rod adapted to hold the movable jaw and to be engaged by the trigger, substantially as described.

In testimony that I claim the foregoing as my own I have hereto affixed my signature in the presence of two witnesses.

WILLIAM C. HOOKER.

Witnesses:
W. H. ROBINSON,
W. A. DETRICK.